United States Patent [19]

Potts

[11] Patent Number: 4,799,627

[45] Date of Patent: Jan. 24, 1989

[54] MINERAL SIZERS

[75] Inventor: Alan Potts, Nottingham, Isle of Man

[73] Assignee: MMD Design and Consultancy Limited, Somercotes, England

[21] Appl. No.: 8,053

[22] Filed: Jan. 16, 1987

Related U.S. Application Data

[63] Continuation of Ser. No. 824,301, Jan. 30, 1986, abandoned, which is a continuation of Ser. No. 532,821, filed as PCT GB82/00354 on Dec. 17, 1982, published as WO83/0207 on Jun. 23, 1983, abandoned.

[30] Foreign Application Priority Data

Dec. 19, 1981 [GB] United Kingdom ................. 8138347

[51] Int. Cl.[4] ............................................ B02C 13/20
[52] U.S. Cl. .................................... 241/236; 241/197; 241/300
[58] Field of Search ................... 241/186 R, 235, 236, 241/294, 300, 292.1, 197, 191, 194; 144/218, 231, 235, 236, 237, 241; 76/101 E, 108 A, DIG. 11; 30/347, 349; 83/698, 663, 838

[56] References Cited

U.S. PATENT DOCUMENTS

| | | | |
|---|---|---|---|
| 1,798,000 | 3/1931 | Schultz | 241/197 |
| 2,986,349 | 5/1961 | Boron . | |
| 3,578,252 | 5/1971 | Brewer | 241/141 |
| 3,991,944 | 11/1976 | Baikoff | 241/236 X |
| 4,241,882 | 12/1980 | Baikoff | 241/191 X |

FOREIGN PATENT DOCUMENTS 688590 2/1940 Fed. Rep. of Germany .
2026907 2/1980 United Kingdom ................ 241/236

Primary Examiner—Timothy V. Eley
Attorney, Agent, or Firm—Ratner & Prestia

[57] ABSTRACT

A mineral breaker including at least one breaker drum having breaker teeth projecting radially therefrom, the teeth being arranged so as to define a series of discrete circumferentially spaced helical formations extending along the drum.

12 Claims, 17 Drawing Sheets

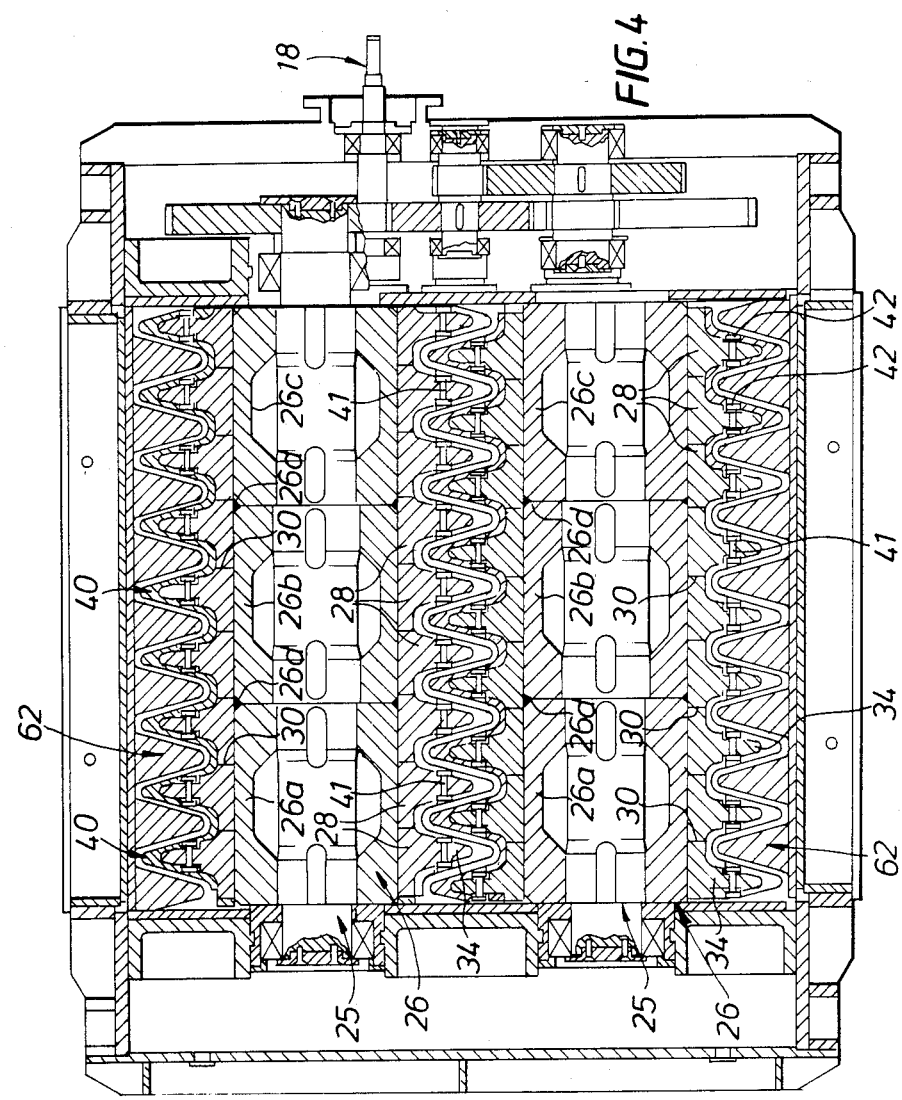

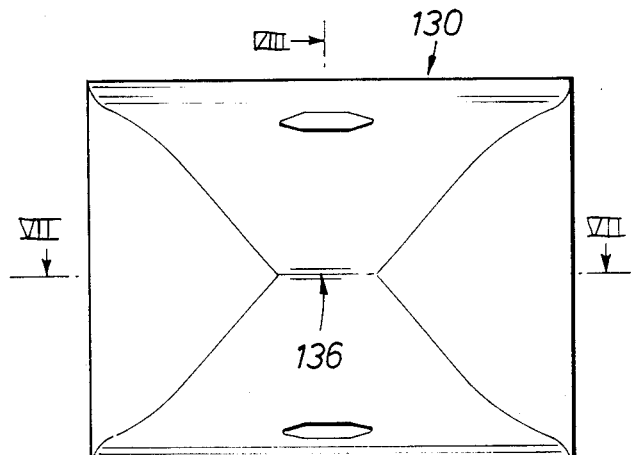
FIG. 14
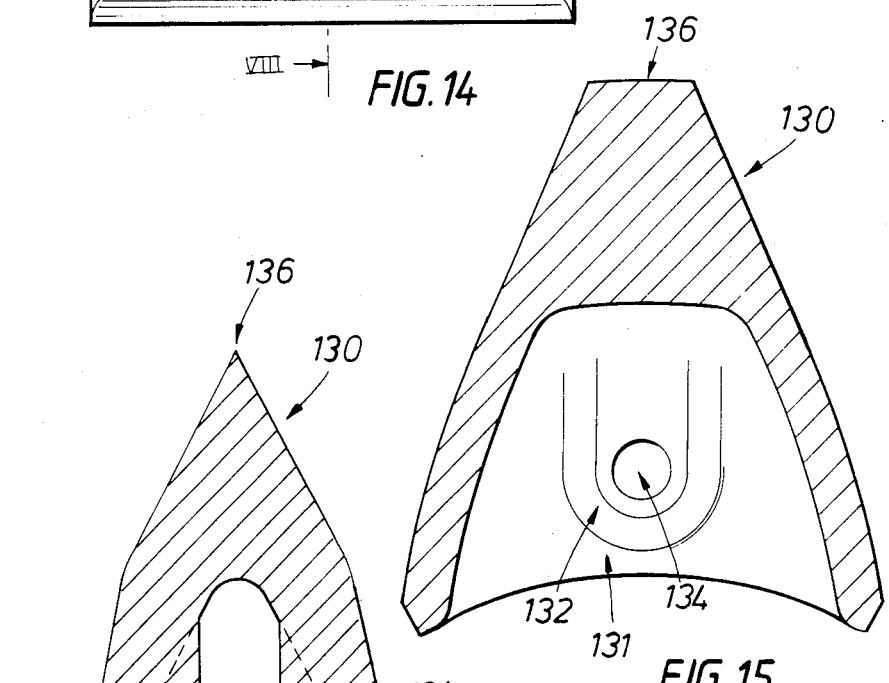
FIG. 15
FIG. 16

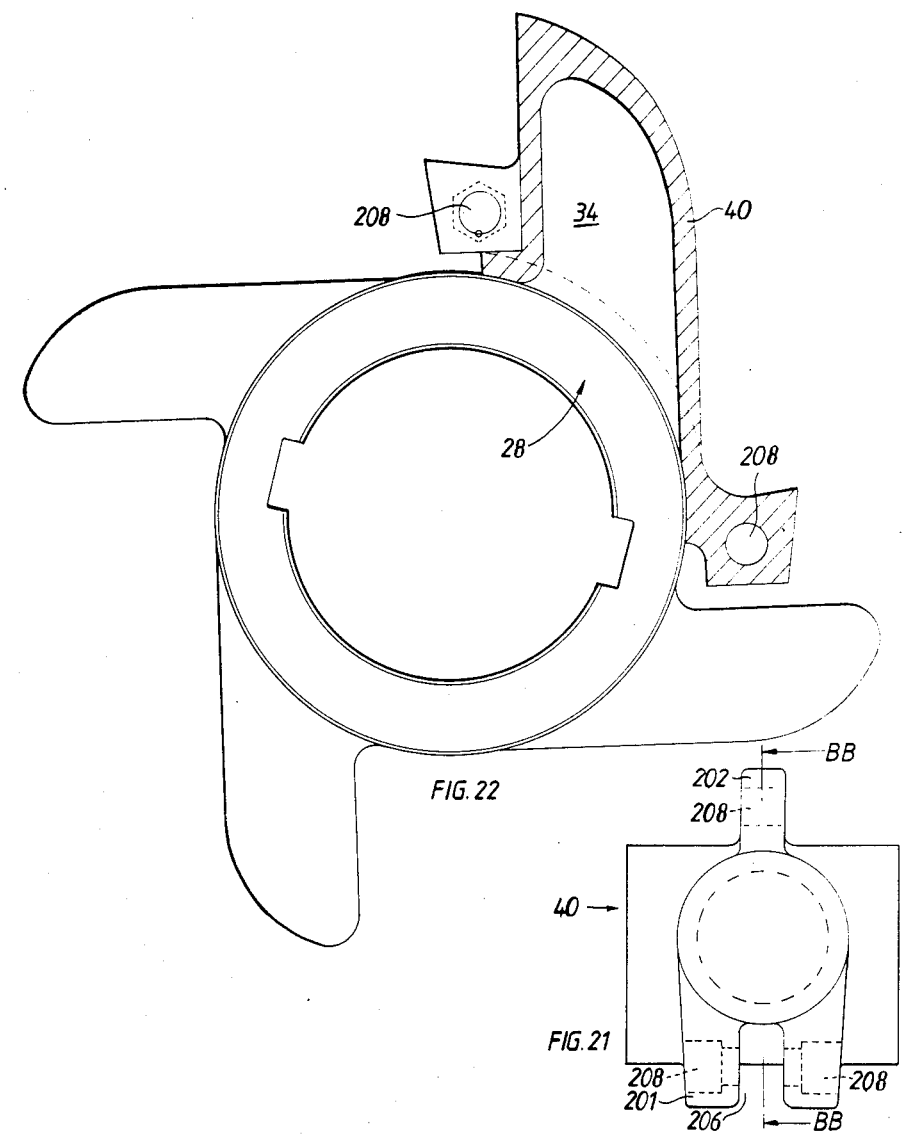

MINERAL SIZERS

This application is a continuation of application Ser. No. 824,301, filed 1/30/86 now abandoned which is a continuation of application Ser. No. 532,021, filed as PCT GB82/00354 on Dec. 17, 1982, published as WO83/02071 on Jun. 23, 1983 now abandoned.

The present invention relates to mineral sizing in particular to mineral sizer and a tooth construction.

According to one aspect of the present invention there is provided a mineral breaker including at least one breaker drum having breaker teeth projecting radially therefrom, the teeth being arranged so as to define a series of discrete circumferentially spaced helical formations extending along the drum.

According to another aspect of the present invention there is provided a tooth construction for a mineral breaker comprising a support and a removable tooth sheath which covers the support.

Advantageously, when assembling a drum composed of a series of annuli, the annuli may be either independently keyed or splined to the common shaft or they may be rings being fixedly secured to one another to form said drum. The former is presently preferred as it enables the drum to be disassembled. Alternatively the assembly of annuli and shaft may be cast integrally to provide a support for the tooth sheaths.

Preferably, the tooth sheaths when in position on all projections serve to completely cover the support or drum to thereby protect it from abrasive wear caused by breakage of mineral.

According to another aspect of the present invention there is provided a mineral sizer having at least one rotatable drum assembly including a tooth construction as defined above.

Various aspects of the present invention will now be described with reference to the accompanying drawings, in which:

FIG. 4 is a longitudinal section through the sizer shown in FIGS. 1 to 3 wherein the sizer teeth are arranged in lines parallel to the axis of rotation of the drums;

FIG. 14 is a plan view of the tooth cap of FIG. 12;

FIG. 15 is a section along line VII—VII in FIG. 14;

FIG. 16 is a section along line VIII—VIII in FIG. 14;

FIG. 21 is a plan view taken along arrow C in FIG. 20;

FIG. 22 is a section view taken along line BB—BB in FIG. 21 and showing the sheath seated on a corresponding support ring.

Figure 1:
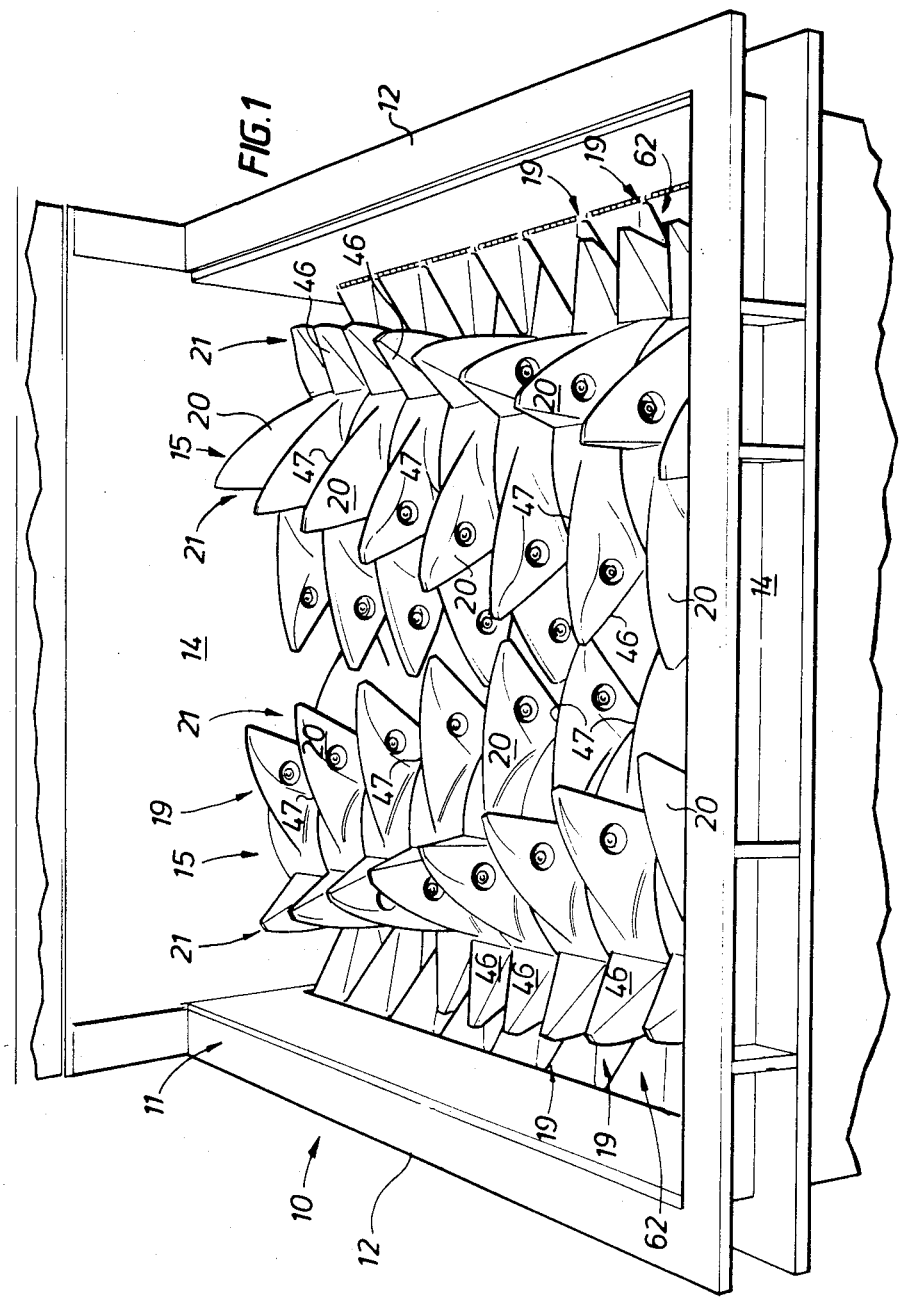
FIG. 1 is a part perspective view of a mineral sizer according to one aspect of the present invention.

Referring initially to FIGS. 1 to 4 and 7 the sizer 10 includes a housing 11 having sides 12 and end walls 14. The housing 11 is conveniently fabricated from steel plate panels which are bolted and welded together.

Rotatably mounted to extend between the end walls 14 are a pair of breaker drum assemblies 15 each of which is geared at one end to the other so that they are driven from a common drive 18 to be rotated in opposite directions. In the embodiment illustrated in FIG. 1 the drums are rotated so as to direct material between them. The gear connection between the drums also serves to set the rotary positions of the drums relative to one another.

Each drum assembly 15 is provided with circumferentially extending groups 19 of breaker teeth 20, the groups 19 being spaced axially along the drum assembly 15. The axial spacing of groups 19 on one drum assembly is staggered to that on the other drum assembly so the teeth 20 in a group 19 on one drum assembly pass between an adjacent pair of groups 19 on the other drum assembly.

Figure 7:
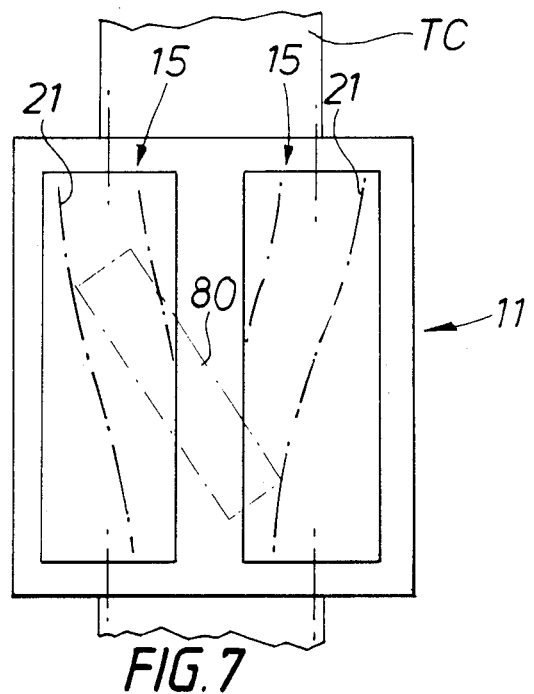
FIG. 7 is a diagrammatic view of the sizer drums shown in FIG. 2.

As seen by reference to FIGS. 1 and 7, the teeth 20 are also preferably arranged to define a series of discrete helical formations 21 which are spaced circumferentially about each drum assembly 15. The helical formations 21 as shown in FIGS. 1 and 7 extend along the axes of each drum in a different sense, i.e. for the left hand drum as seen in FIG. 1 the helical formations 21 extend away from the nearest end wall 14 in an anticlockwise sense and for the right hand drum the helical formations 21 extend in a clockwise sense. Preferably each helical formation 21 in extending along its respective drum passes through an arc of about 90°.

The shape of teeth 20 and their relative positions and size are such that during use, two types of breaking action are present, viz a primary breaking action on larger pieces of mineral whereat the mineral is gripped between opposing leading faces 46 of teeth on opposite drums and a secondary breaking action wherein mineral is trapped between the rear edges 47 of teeth and the leading face 46 of another tooth. Preferably the arc through which end helical formation passes is such as to ensure that a secondary breaking action occurs.

Additionally the spacing between the drums is chosen to that when the tips of teeth on one drum sweep passed the trough defined between groups 19 of teeth on the other drum there is sufficient clearance so that compaction of material is avoided. Accordingly by a suitable choice of spacing it is possible for fine material to quickly pass through the sizer without compaction, thus leaving the sizer to break down larger pieces of material either by the primary and/or secondary breaking action.

Figure 6:
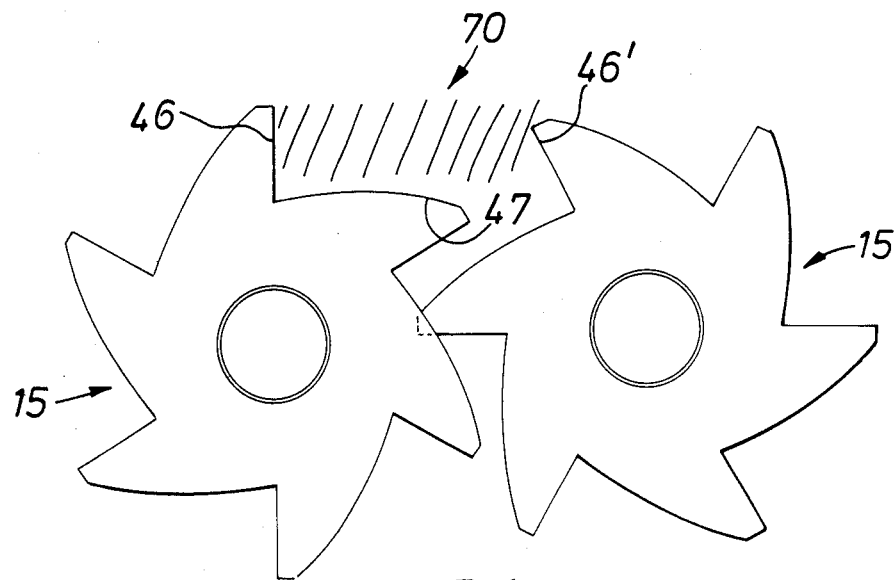
FIG. 6 is a diagrammatic end view of the sizer drums shown in FIG. 2.
Figure 5:
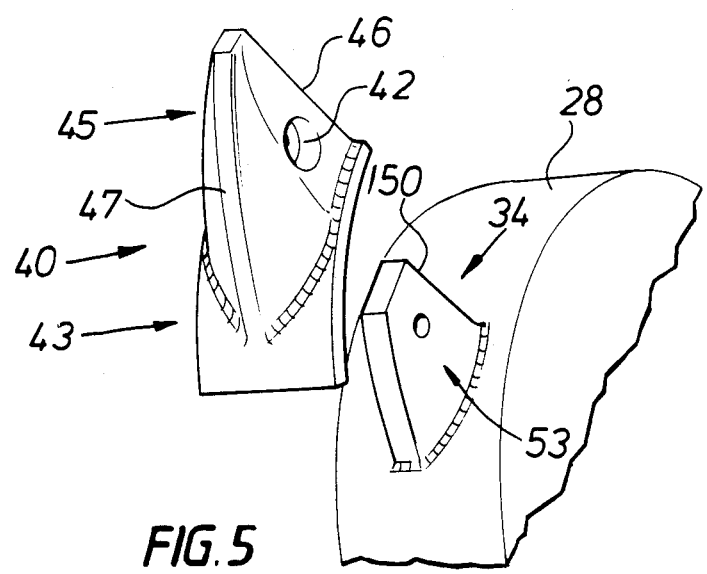
FIG. 5 is an exploded perspective view of a tooth sheath and support according to another aspect of the present invention.

The shape of teeth 20 are designed bearing in mind the hardness and tensile strength of the mineral to be broken. Preferably the teeth are designed to provide as much bite as possible for the primary type of breaking action for the diameter of the drum assembly so as to positively grip large pieces of material. Accordingly the ratio of height of teeth relative to drum diameter is normally large. For example, the tooth height to diameter of drum ratio can be 1:4. In this respect, the cross-sectional extent of a bite region 70 for primary breaking is illustrated in FIG. 6, the depth of the region 70 is defined by the trailing edge 47 of one tooth and the leading edge 46 of a succeeding tooth; and the length of the region 70 is defined between the leading face 46 of one tooth and the leading face 46' of an opposed tooth on the opposite drum. In the embodiment of FIG. 6, the trailing edge 47 which is slightly curved, but which may be straight if desired, is chosen to be approximately tangential to the drum diameter and the leading face 46 is chosen to be approximately located radially relative to the drum. The grip region between teeth on the same group may be varied to alter the size of the grip region by either altering the size of tooth or by altering the number of teeth in each group 19, the maximum grip region being achieved when the point of intersection of face 46 is on or behind (in the direction of rotation of the drum) the location whereat the trailing edge of the preceding tooth merges into the periphery of the drum.

When the teeth are arranged to form helical formations 21 as shown in FIGS. 1 and 7 the grip region varies in width longitudinally of the drums as illustrated in FIG. 7. Accordingly a large piece of material 80 (shown in broken lines) undergoes a succession of primary breaking actions and due to the helical formations 21 the large piece of material 80 is exposed to twisting forces and is urged to move axially along the drums. These actions on a large piece of material result in the piece being successively exposed to positive primary breaking actions and cause it to dance on the drums and do not allow it to settle on them. A similar action is imposed during secondary breaking. Thus problems associated with pieces of mineral settling on the drums and becoming grooved by the rotating teeth are avoided.

A further advantage resulting from the actions imposed on a large piece of material by the helical formations is that the large piece is positively moved along the axes of the drums thereby permitting smaller pieces to pass downwardly thereby and pass through the mineral breaker. Accordingly the mineral breaker is able to handle an in-fill of mineral which contains a large variation in size such as mineral obtained in open-cast quarrying which contains small particulate material as well as large lumps of mineral.

It will be appreciated that the teeth impose tensile breaking forces onto the mineral and so positively breaks the material with minimal production of fines. Additionally since each tooth passes between groups of teeth on the opposite drum positive sizing of mineral occurs since the maximum size of mineral passing through the sizer is determined by the space between the trailing edge 47 of one tooth and the leading face 46 of a succeeding tooth and the distance between adjacent groups 19 of teeth. Therefore if the in-fill material contains only large pieces of mineral the mineral on leaving the sizer will contain no pieces over a predetermined size and will contain a small quantity of fines.

It is also envisaged that the breaker drums may be inclined to the horizontal and arranged so that large pieces of mineral are made to climb up the incline by the helical formations. Due to the agitation of the large piece of mineral it is likely to fall down the incline and is accordingly repeatedly moved along the drums until it has been broken down sufficiently to be broken by the secondary breaking action.

As shown schematically in FIG. 7, the mineral sizer according to the present invention is normally located above a takeaway conveyor TC so that the axes of the drums are generally parallel to the direction of travel of the conveyor TC. By setting the sizer so that the spacing between the drums is generally located above the longitudinal axis of the conveyor material being deposited by the sizer onto the conveyor TC is arranged centrally thereon. This is advantageous as it minimises spillage.

Referring now to the specific construction of the mineral sizer shown in FIG. 1, each drum assembly 15 is shown in longitudinal section in FIG. 4 and includes a stepped shaft 25 on which is keyed a support sleeve 26 made up of three support sleeve portions 26a, b and c. The centre sleeve 26b is of larger internal diameter so that it can be easily slid over most of the shaft 25 during assembly and disassembly. The sleeve portions 26a, b and c are fixedly secured to one another by weld lines 26d so as to form an integral sleeve 26 running the majority of the length of the shaft 25.

A series of annular support rings 28 are mounted on each sleeve 26 and are secured to one another and also to sleeve 26 by weld lines 30. Each ring 28 has a series of teeth support projections 34 integrally formed therewith which are spaced circumferentially about its periphery. Each ring 28 is conveniently formed from a cast metal.

Accordingly, the rotational position of each ring 28 may be easily set during assembly to align or stagger the teeth support projections 34 of adjacent rings 28 by rotating the rings 28 on sleeve 26 and then fixedly securing them in that position. In FIG. 4, the projections 34 on adjacent rings 28 have been set so that the projections form longitudinally extending rows which are substantially parallel to the axis of rotation of the drum assembly 15 in contrast to the arrangement in FIG. 1 wherein adjacent rings 28 have been set so that the projections 34 form the longitudinally extending helical formations 21.

Figure 8:
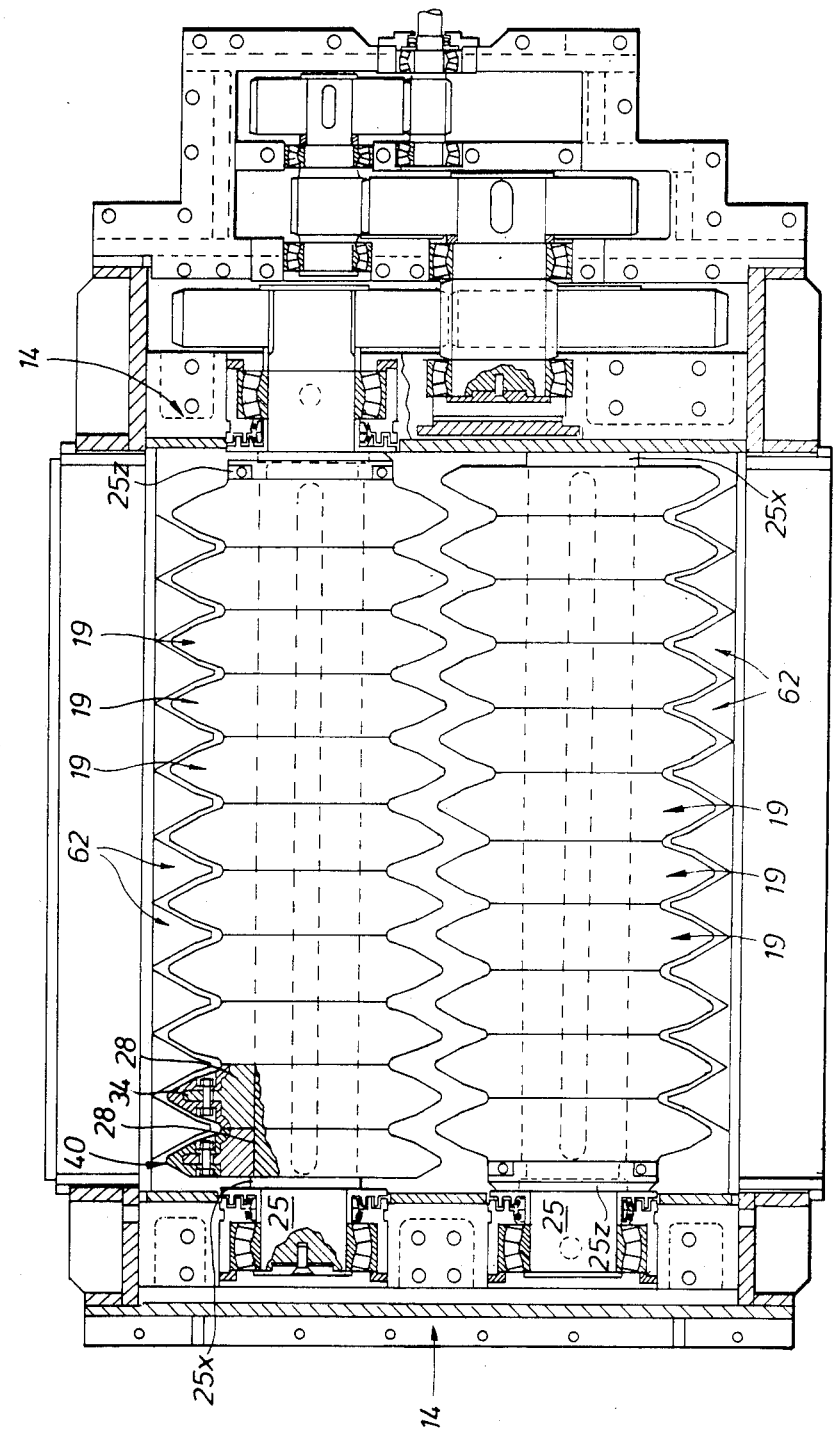
FIG. 8 is a similar view to FIG. 4 showing an alternative embodiment according to the present invention.

In FIG. 8 an alternative construction is illustrated wherein the annular support rings 28 are each keyed or splined directly onto the shaft 25. Each ring 28 is therefore only in abutment with its neighbour and the assembly of rings 28 are prevented from axial movement by virtue of a shoulder 25x and a removable collar 25z. Accordingly should the shaft or a ring become damaged during use, the shaft and ring assembly may be disassembled for replacement of the damaged component. It will be appreciated that each ring may be easily angularly offset to its neighbour to provide the desired helical formation 21, the amount of offsetting being determined in steps dictated by the pitch of the splines.

A further alternative is to cast the series of annular support rings and shaft integrally with one another.

A tooth sheath 40 is secured to each projection 34 via a bolt 41, or other similar means such as a sprung spigot, which is located in pockets 42 in the sheath and are thus protected from damage during use. When all sheaths are in position they collectively form a cover over adjacent rings 28 so that the rings are protected from wear by mineral being sized.

Each sheath 40 has an annular base portion 43 which follows the contour of ring 28 and a hollow tooth portion 45 integrally connected to the base portion 43. The tooth portion 45 has an internal pocket which is of a complementary shape to a projection 34 so when the tooth portion is seated upon a projection, loads imparted onto the tooth portion 45 during use are transmitted onto the projection 34.

In this respect, during use each tooth is exposed to two main sources of loadings; firstly a loading on its leading face 46 resulting from a primary or secondary breaking action and secondly a loading on its trailing edge 47 resulting from a secondary breaking action. The shape of projection 34 and that of tooth portion 45 is chosen so that when the tooth is exposed to the first type of loading the face 46 transmits the loading onto the leading face 150 of projection 34 and is encouraged to move in a generally radially inward direction so that the sheath 40 is pressed onto the projection 34 and peripheral surface of ring 28. The shape of the trailing edge 47 and of the complementary surface 53 of projection 34 are chosen to provide a wedge effect to restrain movement of the sheath 40 in a generally circumferential direction about ring 28, the wedge effect serving also to transmit loadings on the trailing edge 47 onto the complementary surface 53. Accordingly loadings arising from breakage of mineral are transmitted onto the rings 28 and so bolts 41 are not exposed to loadings and merely act to retain its associated sheath on a projection 34.

Figure 2:
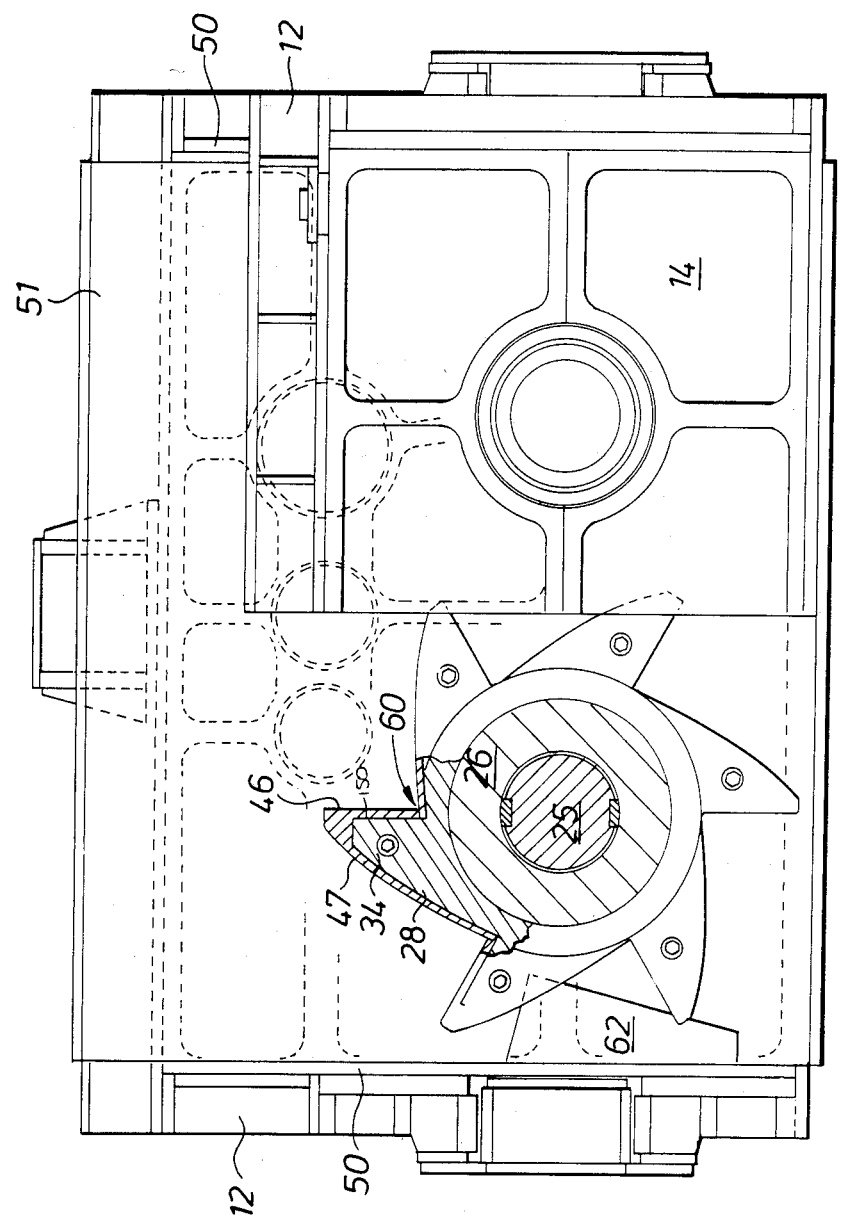
FIG. 2 is an end view, partly in section, of the sizer shown in FIG. 1.
Figure 3:
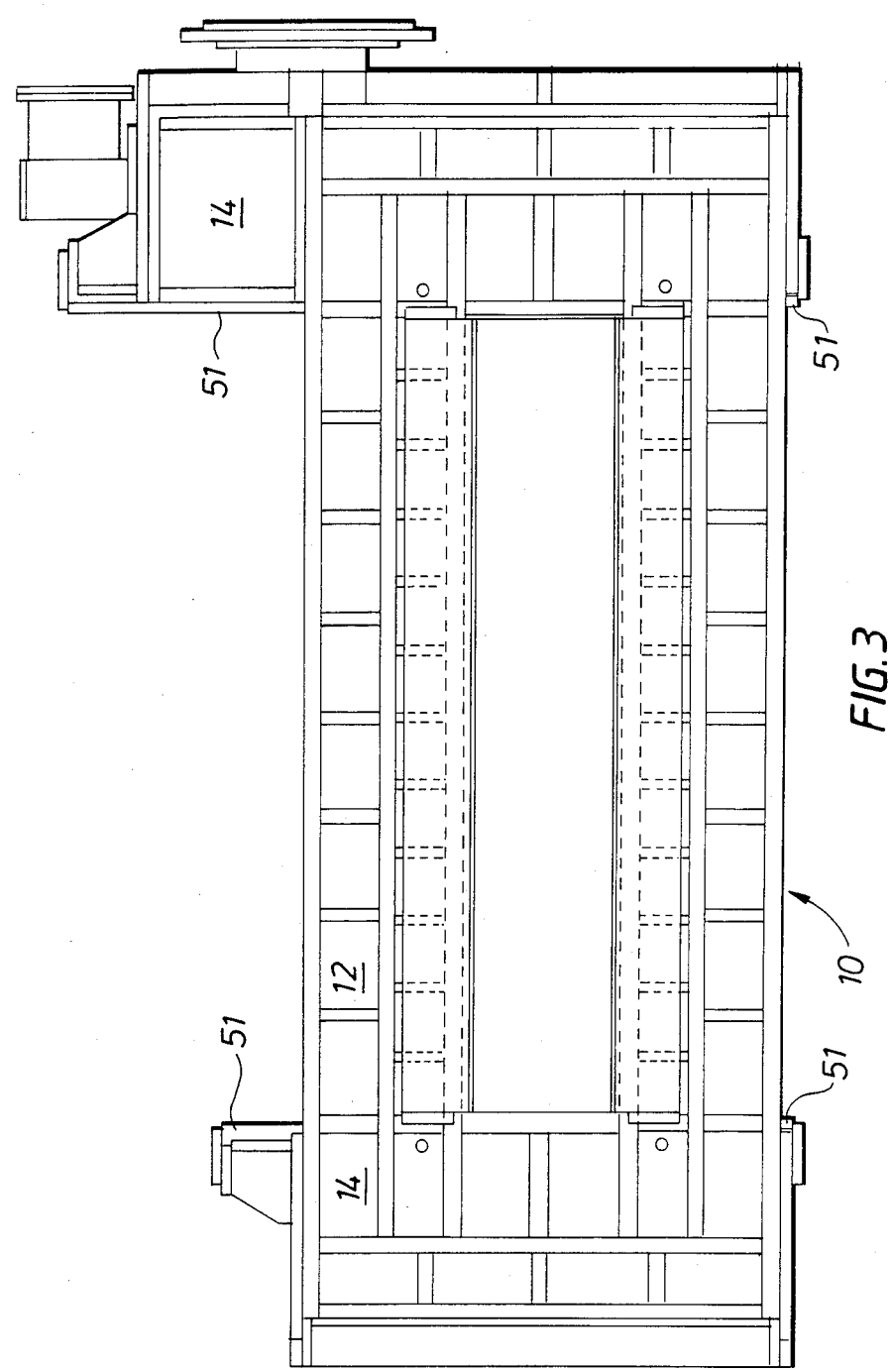
FIG. 3 is a side view of the sizer shown in FIG. 1.

As seen in FIG. 2 a rebate 60 is preferably provided at the base of each face 46 to receive a marginal end portion of the annular base portion 43 of the preceding sheath 40. If desired the base of each tooth and the base portion 43 of each preceding sheath 40 may be joined together by welding to thereby form a more rigid annular cover for each ring 28.

It will be appreciated that during use, portions of each sheath 40 will wear away and that eventually the sheaths 40 will have to be replaced. This is easily and quickly done with the present sizer by removal of bolts 41 (and, if appropriate removal of weld) and so refurnishment of the sizer teeth may be quickly achieved on site by personnel without the need of heavy lifting gear. Additionally, the inner surfaces of the side walls and end walls may be lined with steel plate which act as wear plates 50, 51 respectively to protect the side and end walls from abrasive wear. The wear plates are removably secured in position so that they can be replaced periodically after excessive wear has occurred.

A row of teeth 62 are provided to extend longitudinally along each side wall to intermesh with teeth 20 to prevent material passing between the side wall and adjacent drum assembly. The teeth 62 are conveniently secured to wear plates 50 by welding.

An alternative ring and tooth construction is illustrated with reference to FIGS. 9-16 wherein similar parts are designated by similar reference numerals.

Figure 9:
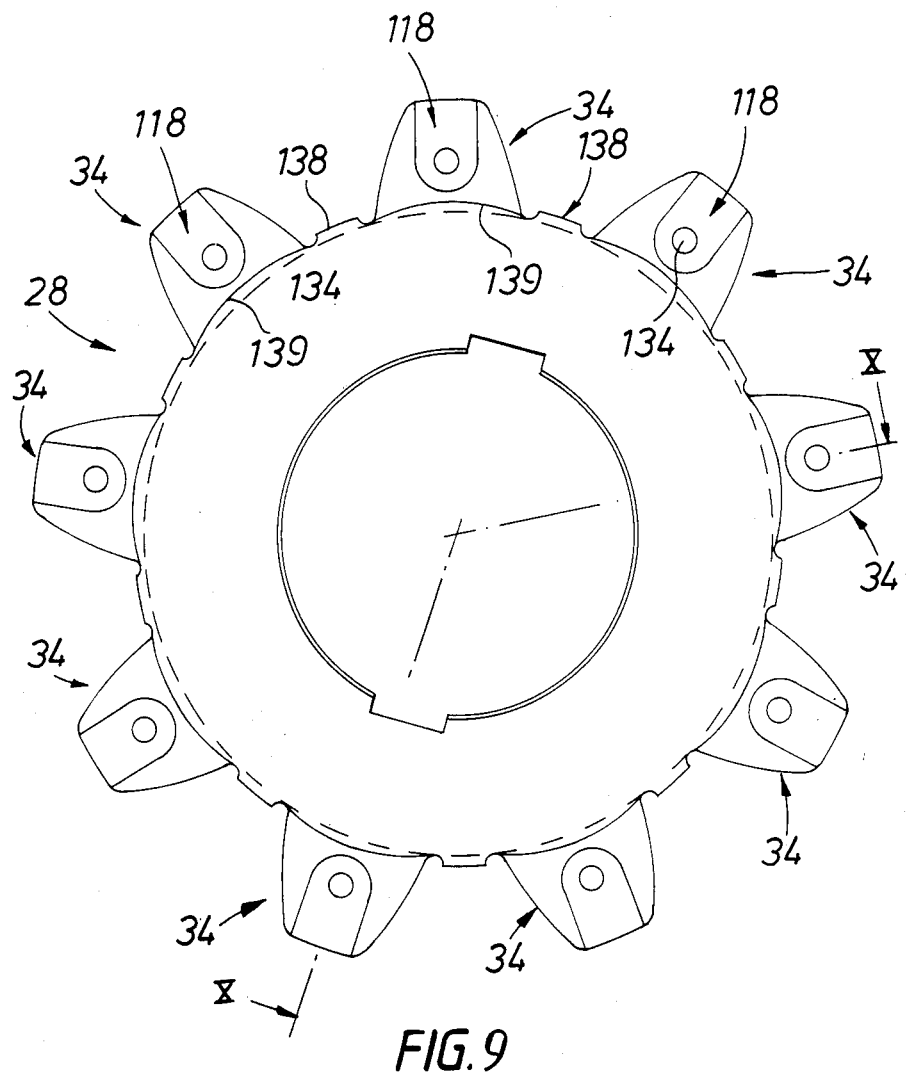
FIG. 9 shows a support ring for forming part of a breaker drum in a mineral sizer according to another embodiment of the present invention.
Figure 11:
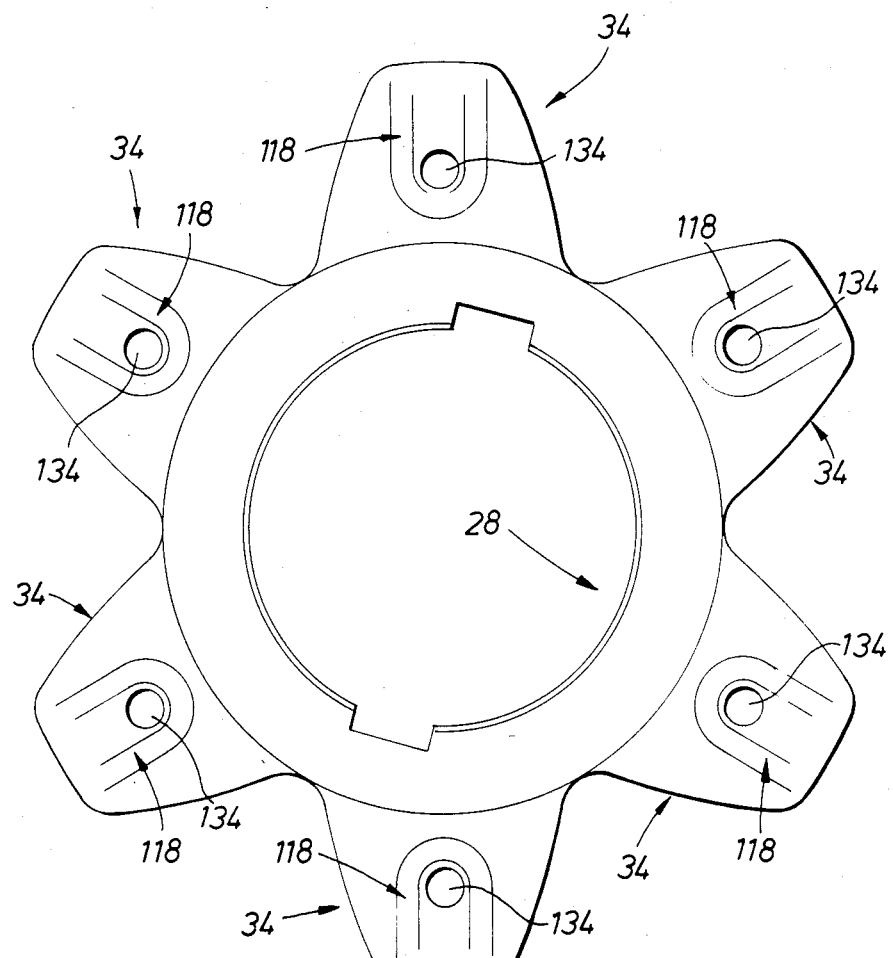
FIG. 11 shows a support ring similar to the support ring shown in FIG. 9 but of reduced diameter.
Figure 13:
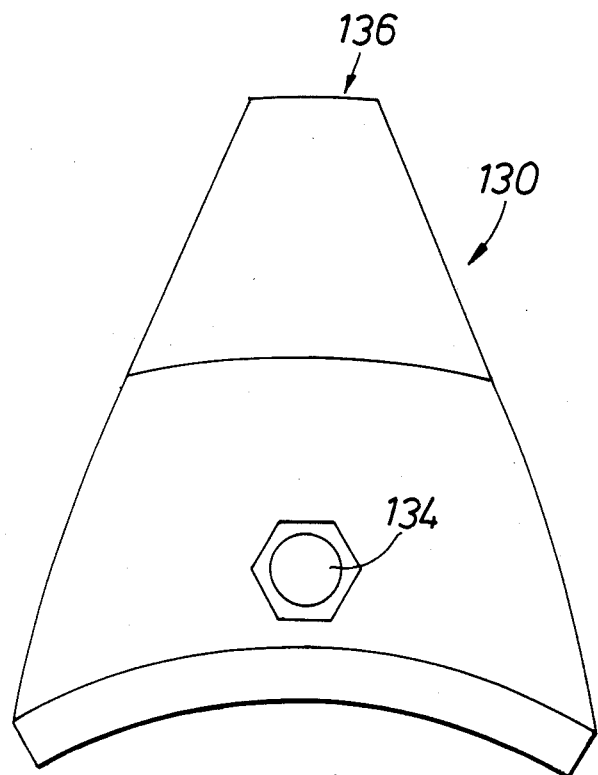
FIG. 13 is a side view of tooth cap of FIG. 12.
Figure 12:
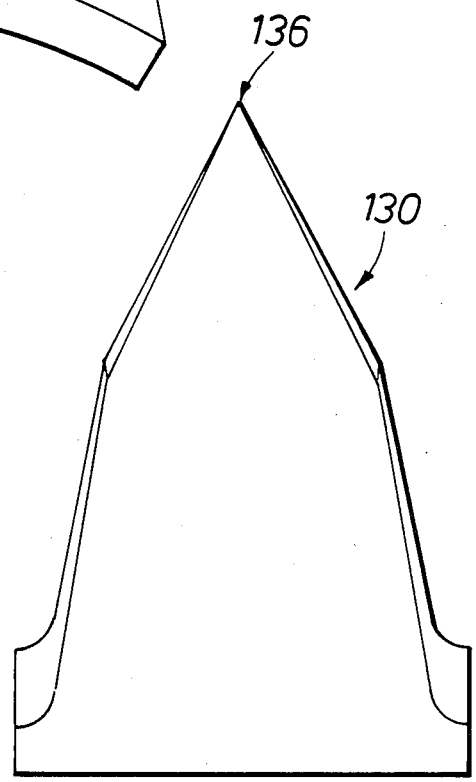
FIG. 12 is a front view of a tooth cap for fitting onto the support rings of FIGS. 9 to 11.

In FIGS. 9 and 11 there are shown two alternative support rings 28 which are intended to be keyed directly to a shaft as in the FIG. 8 embodiment and which are of different external diameter but are intended to receive the same dimensioned tooth sheath 130.

Each support ring 28 shown in FIGS. 9 and 11 is provided with a series of teeth support projections 34 which are integrally cast with the support ring.

The tooth cap 130 illustrated in FIGS. 12 to 16 is cast from a suitable wear resistant material and its external shape is designed so as to be symmetrical about section lines VII—VII and VIII—VIII respectively. The terminal end of each cap 130 terminates in the form of a ridge 136 which extends in the direction of rotation of the drum. By varying the length of the ridge 136 the strength of the tip of the tooth can be adjusted. The cap 130 has an internal pocket or recess 131 for receiving a projection 34, the recess 131 having a shape complementary to the shape of projection 34 so that loadings are transmitted onto the projection 34.

Figure 10:
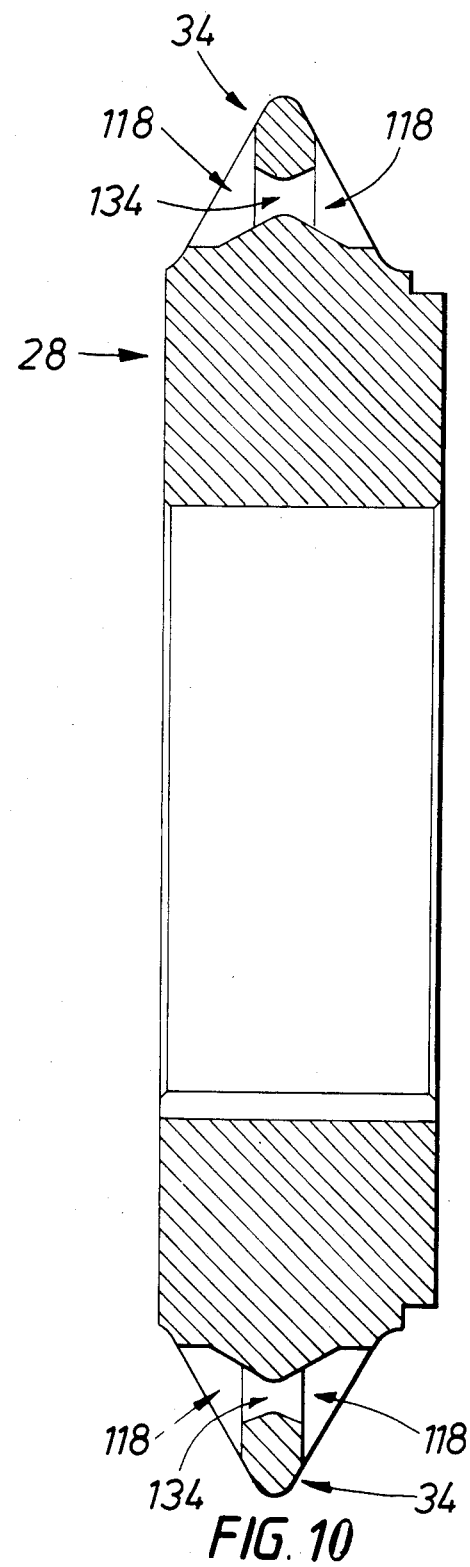
FIG. 10 shows a section along line X—X in FIG. 9.

As seen in FIGS. 9 to 11 each projection 15 has a pair of recesses 118 (only one of which is visible in FIGS. 9 and 11) and the internal recess 131 of each cap 130 has inwardly projecting flanges 132 of complementary shapes to recesses 118 so that the flanges 132 and recesses 118 co-operate to positively key the tooth caps 130 in position. The caps 130 and projections 34 each have co-operating bores 134 passing therethrough to enable a bolt to be passed through for preventing removal of the cap from an associated projection.

By altering the diameter of the support rings but retaining the same shape of projection 34 it is possible to use the same size of caps 130 for different diameters of breaker drums. This is illustrated by comparison between FIGS. 9 and 11 wherein the bottom edge of each tooth cap 130 is of the same radius of curvature as the diameter of ring 28 in FIG. 11 whereas in FIG. 9 the radius of curvature of the ring 28 is greater. Accordingly, in order to accommodate caps 130 on ring 28 shown in FIG. 9, complementary curved support surfaces 139 are provided separated by ridges 138.

Figure 17:
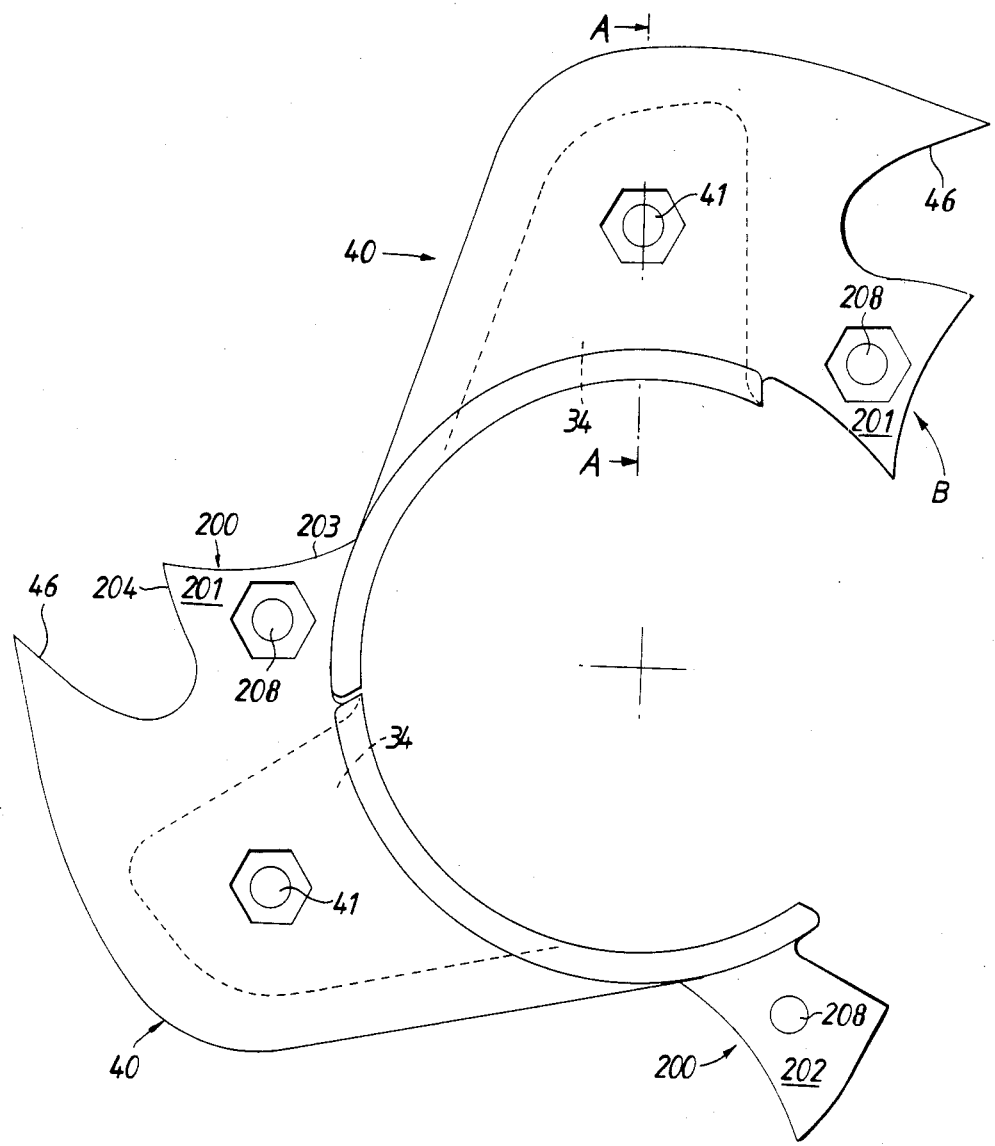
FIG. 17 is a side view of a further tooth sheath construction according to the present invention.
Figure 18:
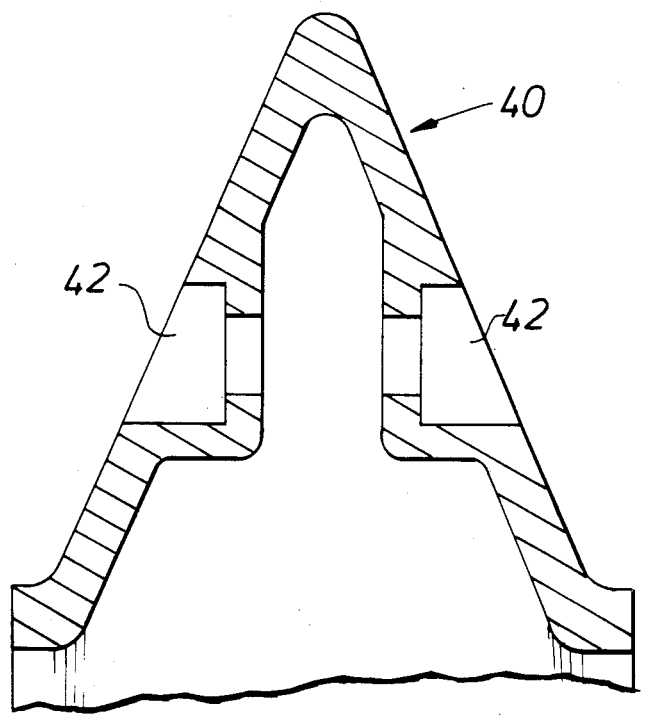
FIG. 18 is a section along line A—A in FIG. 17.
Figure 19:
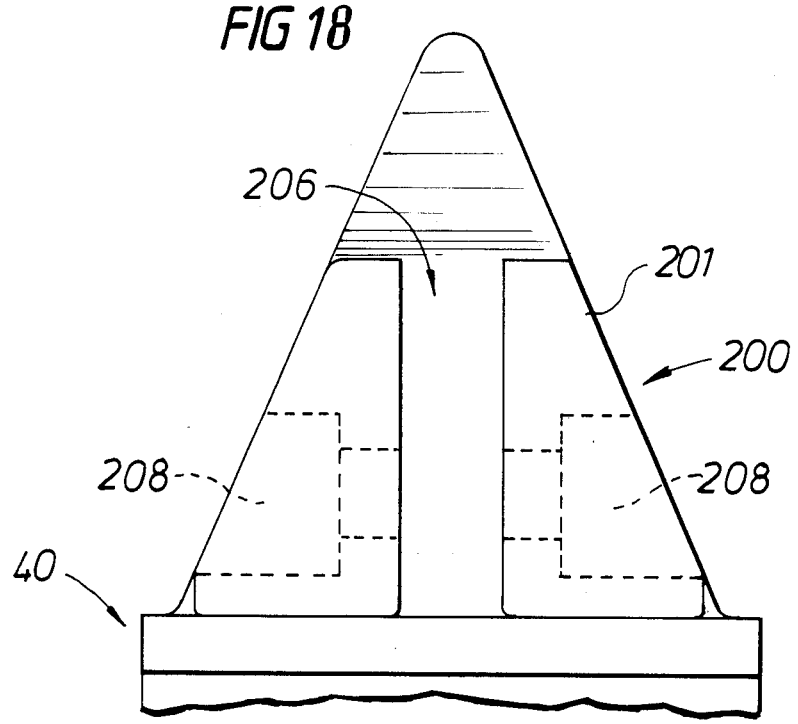
FIG. 19 is an end view as seen in the direction of arrow B in FIG. 17.

A further alternative of a tooth sheath is illustrated in FIGS. 17, 18 and 19 wherein the tooth sheaths 40 on a given support ring 28, in addition to being connected to a respective projection 34 by a bolt 41, the tooth sheaths are also connected to one another by a connection formation 200 which is itself preferably tooth shaped. Accordingly, at one circumferential end of each sheath 40 is provided first part 201 of the formation 200 and at the other circumferential end with a second part 202 of the formation 200. The first part 201 is generally tooth shaped having a leading face 203 and trailing face 204. The first part 201 is provided with a centrally located recess 206 into which the second part 202 of a preceding sheath 40 projects. Both the first part 201 and second part 202 are provided with through bores 208 which align when adjacent sheaths are positioned on a ring 28 and through which a bolt (not shown) is passed in order to secure co-operating parts 201, 202 together. The provision of connection formations 200 stabilises the annulus of connected sheaths 40 extending about a given ring 28 and serves to reduce chatter between the sheaths 40 and ring 28 during use. In view of the stabilising effect it has been found possible to provide the teeth 20 with a leading face 46 which has a positive rake as is clearly illustrated in FIG. 17.

A further alternative shape of tooth 20 and corresponding projection 34 is illustrated in FIGS. 20 to 23 wherein the tooth 20 is in the form of a pick having a generally cylindrical body. In this embodiment the sheaths 40 are secured onto a given ring 28 by being connected to one another by connection formations 200 only.

Figure 20:
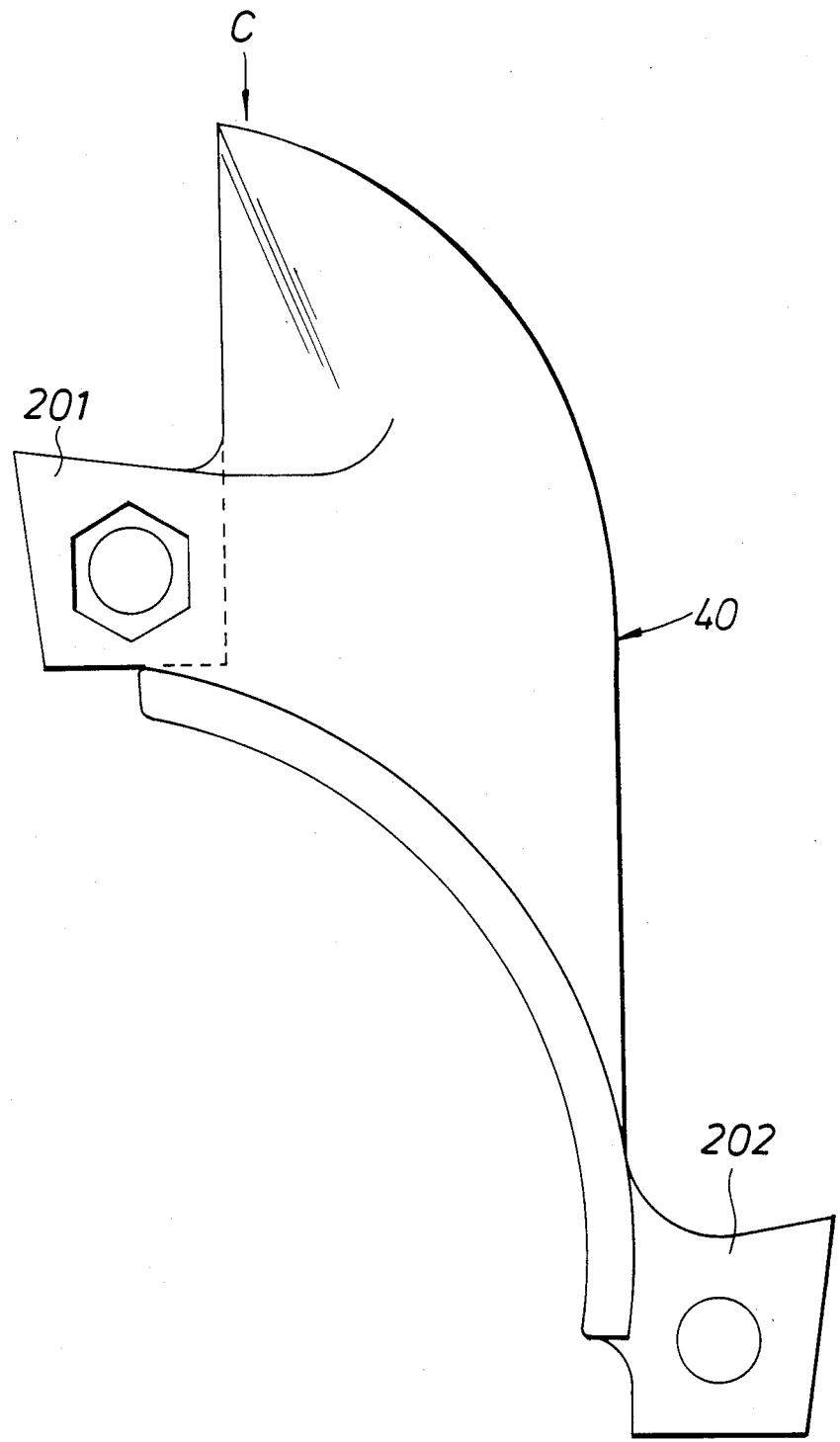
FIG. 20 is a side view of a further tooth sheath construction according to the present invention.
Figure 23:
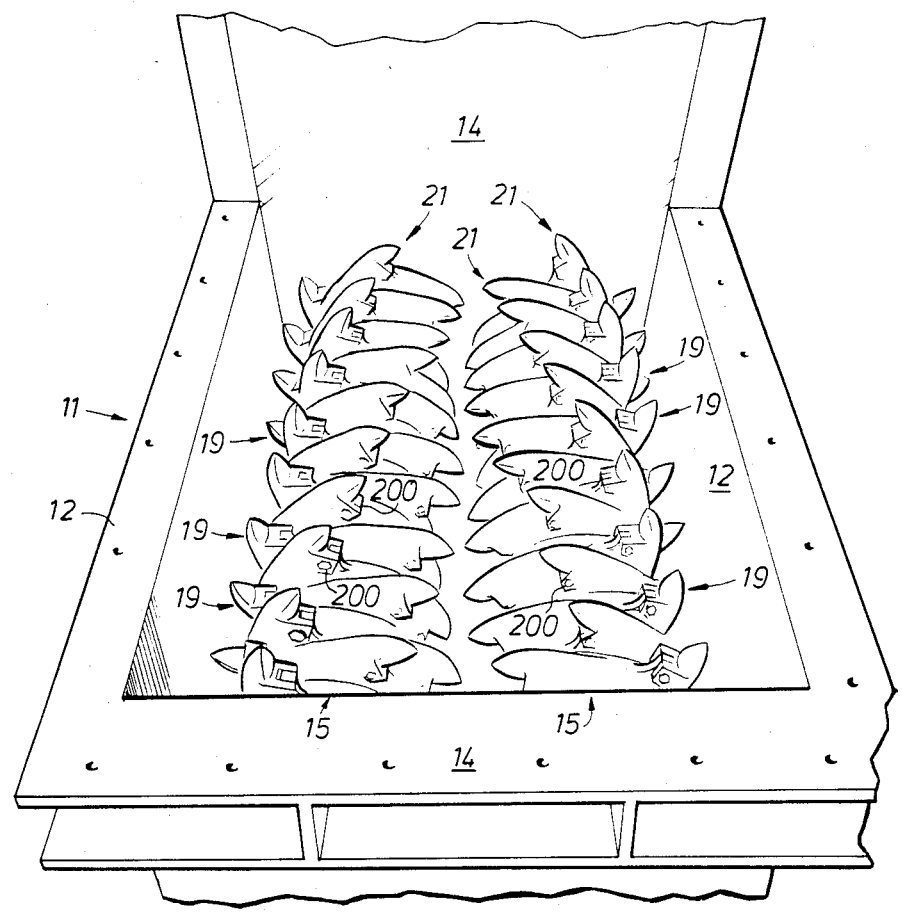
FIG. 23 is a part perspective view of a mineral sizer including drum assemblies made up of tooth sheaths and support rings illustrated in FIGS. 20–22.

It is to be appreciated that drums assembled from any of the tooth sheath constructions described above are preferably arranged so that the teeth form helical formations 20. By way of further example reference is made to FIG. 23 which is a view similar to FIG. 1 and in which each drum includes a series of sheaths as shown in FIGS. 20–22 arranged to define helical formations 21. It is however also possible in certain applications for the teeth 20 to be arranged in rows extending generally parallel to the axis of the drum. It is also envisaged that the helical formations 21 on both drums may extend about their respective axes in the same sense. In such a situation large pieces of mineral deposited on the drums will be acted upon by the helical formations on one drum to move in one axial direction and be acted upon by the helical formations on the opposite drum to be moved in the opposite axial direction. Such movement results in an agitation of the large pieces of mineral deposited on the drums and so assist gripping of the mineral by the teeth. A further alternative is for one drum to have a helical formation and the other drum to have teeth aligned in rows arranged parallel to the axis of the drum.

It is also envisaged that the drums may be rotated in opposite directions so that material deposited thereon is moved toward the side walls of the sizer for breaking. Additionally it is also envisaged that a sizer having a single breaker drum may be provided in which the teeth on the drum co-operates with a side wall of the sizer housing and/or static teeth mounted thereon for breakage of mineral.

I claim:

1. In a mineral breaker having at least a first breaker drum including a plurality of breaker teeth projecting radially from the drum and further including a plurality of opposed breaker teeth positioned so that on rotation of the drum mineral lumps to be broken are gripped between the leading face of the teeth of the drum and a pair of said opposed breaker teeth to thereby break the mineral lump gripped therebetween by a snapping action, the improvement of the breaker teeth mounted on the breaker drum each comprising a main tooth body in the form of a projection projecting from the drum and a sheath removably mounted on the tooth body, the sheath including a hollow tooth formation which defines the external shape of the tooth and which includes a pocket which is seated on and fully envelopes the tooth body, the shape of the tooth body and the pocket being complementary so that when the sheath is seated on the tooth body the leading and trailing faces of the tooth body and the respective facing internal walls of the pocket are in face contact with one another so that loadings applied to the tooth during said snapping action are transmitted through the sheath and onto the main tooth body.

2. A mineral breaker according to claim 1 wherein the teeth on said breaker drum are arranged in circumferentially extending groups spaced axially along the drum, the main body of each tooth in a given group being mounted on a common annulus.

3. A mineral breaker according to claim 2 wherein the tooth sheaths of a given group are connected to one another when mounted on said annulus.

4. A mineral breaker according to claim 3 wherein each tooth sheath of a given group is provided at one circumferential end with a first part of a connection formation and at the opposite circumferential end with a second cooperating part of said connection formation.

5. A mineral breaker according to claim 4 wherein said connection formation is tooth-shaped.

6. A mineral breaker according to claim 2 wherein a series of annuli are mounted side-by-side on a common shaft.

7. A mineral breaker according to claim 1 further including a second breaker drum placed alongside said first breaker drum and having said opposed breaker teeth projecting radially therefrom, said teeth on each drum being arranged in circumferentially extending groups, said groups of teeth on said first drum being located between adjacent groups of teeth on said second drum, the teeth on at least one of said drums being arranged to define a first series of discrete circumferentially spaced helical formations extending along the length of said drum.

8. A mineral breaker according to claim 7 wherein said teeth on the other of said drums are arranged to define a second series of discrete circumferentially spaced helical formations extending along the length of said other drum.

9. A mineral breaker according to claim 8 wherein said first and second drums are arranged to rotate in opposite directions, said helical formations on said first drum being arranged in an opposite sense to said helical formations on said second drum so that said helical formations cooperate in tending to move large pieces of mineral deposited thereon in a single axial direction.

10. A mineral breaker according to claim 8 wherein the rotational positions of said first and second drums are arranged so that during rotation each helical formation on said first drum projects into the space between adjacent helical formations on said second drum.

11. A mineral breaker according to claim 8 wherein said first and second drums are arranged to rotate in opposite directions, said helical formations on said first drum being arranged in the same sense as said helical formations on said second drum so that said helical formations on said first drum tend to move large pieces of mineral deposited thereon in a direction opposite to that which said helical formations on said second drum tend to move pieces of mineral.

12. A mineral breaker according to claim 7 or claim 8 or claim 9 or claim 10 or claim 11 further including a belt conveyor positioned beneath said breaker drums, the direction of travel of said conveyor being substantially parallel to the axes of said breaker drums.

* * * * *